Dec. 21, 1965 A. J. WINTER 3,225,215

BISTABLE SWITCHING CIRCUIT EMPLOYING OPPOSITE CONDUCTIVITY TRANSISTORS

Filed July 23, 1962

ARTHUR J. WINTER, INVENTOR.

BY HIS ATTORNEYS.

Spensley & Horn.

3,225,215

BISTABLE SWITCHING CIRCUIT EMPLOYING OPPOSITE CONDUCTIVITY TRANSISTORS

Arthur J. Winter, Encino, Calif., assignor to Anadex Instruments, Inc., Los Angeles, Calif., a corporation of Nevada Filed July 23, 1962, Ser. No. 211,787
5 Claims. (Cl. 307—88.5)

This invention relates to electrical switching circuits and more particularly to a bistable transistorized circuit of improved design.

This invention is of particular value for use in a counter circuit of the type typically utilized in present art electronic computers. Such a counter circuit includes switching circuitry for control of a visual readout device which displays a number in decimal form representative of the number of electrical pulses impressed on the system. Thus, for example, the circuit may "count" or indicate the number of pulses fed into it by assuming a different "state" each time a pulse is impressed. The state the circuit is in at any one time will accordingly be indicative of the number of pulses received.

A typical visual readout device is the so-called "Nixie" tube, "Nixie" being the registered trademark of the Burroughs Corporation. This tube is primarily a neon tube including ten separate cathodes and a single anode. The cathodes are so arranged that the glow discharge between each cathode and the anode is in the shape of a different integer from 0 to 9. The cathodes are generally aligned in a column so that each integer will appear within the same general area. In operation, the cathodes are normally maintained at a predetermined voltage relative to the anode, the potential difference between the anode and the cathodes being less than the tube firing voltage. If the potential of any of the cathodes is suddently reduced to a sufficiently low value so that the potential difference between that cathode and the anode is in excess of the tube firing potential, ionization of the gas between that particular cathode and the anode will occur, the shape of the illuminated integer providing a visual indication of the state of the counter.

"Nixie" tubes generally require a substantial cathode potential swing to switch each cathode between the "off" and "on" states. For example, in the "off" condition, the cathodes are typically maintained at a voltage of about 40 to 60 volts, while in the "on" condition, the voltage at the cathodes approaches zero. Thus, in a transistorized system, a transistor amplifier is generally required to amplify the signal generated by the switching or counting circuit as the change in voltage level would otherwise be insufficient to switch a "Nixie" output tube. In such output tubes, it is currently necessary to provide a separate transistor amplifier for each of the cathode input circuits in those instances where low voltage transistor counter circuits are employed. The present art transistorized counter circuits usually include an Eccles-Jordan flip-flop comprising two transistors and associated circuit elements, wherein the transistors are connected in tandem. During the operation of a typical Eccles-Jordan circuit, one of the two transistors is always "on," the other transistor being "off." The output voltage swing is generally on the order of 6 to 25 volts, and hence this output voltage must be amplified to enable it to switch a cathode of the "Nixie" output tube. While some of the more sophisticated, and therefore relatively expensive, recently developed transistors will provide a sufficient output voltage, their high cost generally precludes their use in a commercially competitive computer.

It is therefore a primary object of the present invention to provide a transistorized switching circuit capable of producing an output signal of a predeterminal value.

It is another object of the present invention to provide a simplified bistable circuit suitable for use in counter circuits to provide a relatively high output voltage signal.

It is a further object of the present invention to provide a simplified transistorized switching circuit which does not require additional voltage amplification to switch a "Nixie" output tube.

It is a still further object of the present invention to provide a simplified transistorized switching circuit adapted for use in a ring counter.

It is yet another object of the present invention to provide a relatively simple and inexpensive transistorized switching circuit for triggering of a "Nixie" tube.

It is also an object of the present invention to provide a novel decimal counter of improved design.

The objects of the present invention are accomplished, in general, by a bistable, two-transistor switching circuit utilizing direct coupling and D.C. feedback, the transistors being of opposite conduction characteristic types and having their emitters interconnected.

The novel features which are believed to be characteristic of the invention, both as to its organization and method of operation, together with further objects and advantages thereof will be better understood from the following description in which presently preferred embodiments of the invention are presented by way of example. It is to be expressly understood, however, that the description is for the purpose of illustration only and that the true spirit and scope of the invention is defined by the accompanying claims.

Figure 1:
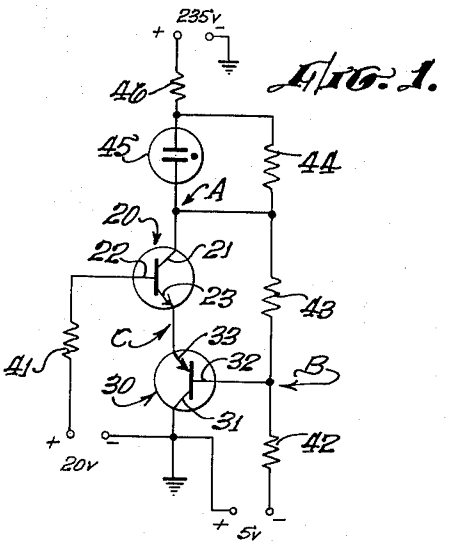
FIGURE 1 is a schematic diagram showing the basic bistable switching circuit of the present invention.

Referring now to the drawing, and particularly to FIGURE 1 thereof, there is shown a schematic diagram of the basic switching circuit of the present invention. The circuit utilizes two transistors, an NPN transistor 20 and a PNP transistor 30, the transistor 20 includes a collector electrode 21, a base electrode 22, and an emitter electrode 23. The transistor 30 includes a collector electrode 31, a base electrode 32, and an emitter electrode 33. The base 22 of the transistor 20 is connected to the positive terminal of a 20 volt bias source through a resistor 41, the negative terminal of the 20 volt bias source being grounded. The emitter 23 of the transistor 20 is directly connected to the emitter 33 of the transistor 30. The collector 31 of the transistor 30 is grounded. The base 32 of the transistor 30 is connected to the negative terminal of a 5 volt bias supply through a resistor 42, the positive terminal of the 5 volt bias supply being grounded. The collector 21 of the transistor 20 is connected to the base 32 of the transistor 30 by a resistor 43. The collector 21 of the transistor 20 is also connected to the positive terminal of a 235 volt D.C. supply through the series combination of a gas discharge tube load 45 and a resistor 46, the negative terminal of the 235 volt D.C. supply being grounded. A resistor 44 is connected in shunt with the gas tube 45.

For purposes of explanation, the connection to the collector 21 of the transistor 20 will be designated as reference point A, the connection to the base 32 of the transistor 30 designated as a reference point B, and the interconnected emitter electrodes of the transistors designated as a reference point C. The resistor 46 is a current limiting resistor and its resistance value is chosen to provide a safe operating current for the gas discharge tube 45. The resistance values of the resistors 44, 43 and 42 are chosen to place reference point A at a potential of approximately +60 volts and to place reference point B at a potential of about +30 volts with the gas discharge tube 45 in the un-ionized or "off" condition and the transistors in the non-conducting state. The voltage drop across the resistor 44 under these conditions is approximately 40 volts, which is less than the firing potential of the glow tube 45. Without going into the means for switching the circuit from the "off" state to the "on" state, let us first assume that the circuit is in the "off" state. Thus, no current other than very small leakage currents are flowing through the transistors 20 and 30. The leakage current through the transistor 30 will cause the reference point C to be near the transistor base potential, which is about 30 volts. Since the base 22 of the transistor 20 is positively biased from a 20 volt source, the transistor 20 will be effectively reverse biased due to the 30 volt potential of its emitter 23. If the potential at the reference point C tends to rise above 30 volts, it will tend to provide additional reverse bias voltage to the transistor 20 and will tend to forward bias the transistor 30 and turn it on. It is readily apparent, however, that the high impedance of the transistor 20 together with the un-ionized gas tube load 45 will prevent the flow of any significant amount of current through the transistor 30. Transistor 20 is held in a non-conducting state not by biasing but because it has an infinite load resistance, its load resistance being transistor 30 which is biased "off." If, on the other hand, the potential at the reference point C tends to go below 30 volts, additional reverse bias voltage will be applied to the transistor 30, the high impedance of the transistor 30 thereby preventing the transistor 20 from being turned "on." Thus, the circuit is stable, each transistor tending to "clamp" the other transistor in the "off" state, the direct intercoupling of the transistors providing a D.C. feedback effect.

We will now view the two transistors 20 and 30 in the "on" condition, the transistors having been switched by an applied signal pulse as will be explained hereinafter. With both of the transistors 20 and 30 conducting heavily, a low impedance path to ground is provided from the reference point A, and the reference point A will then be at or near ground potential. Immediately upon dropping the potential of reference point A, a larger voltage drop will appear across the gas discharge tube 45, thereby causing it to fire and conduct current heavily, the voltage drop across the discharge tube then being at a relatively low value in accordance with its negative resistance characteristic. The reference point B will be at a potential of approximately −1 volt, as it is coupled to a −5 volt negative bias source through the resistor 42. The reference point C will be at or near ground potential. The load current of the gas discharge tube 45 flows through the relatively low collector-emitter impedance of the forward biased transistors 20 and 30. The circuit is stabilized in the "on" state in a manner similar to its stabilization in the "off" condition. If the voltage at reference point C tends to rise, it will tend to decrease the forward bias on the transistor 20 to tend to increase its impedance and decrease the flow of load current. However, a tendency of the reference point C to increase in potential will also tend to more strongly forward bias the transistor 30, thereby tending to decrease its impedance and cause a heavier current flow to hold the potential of the reference point C down. On the other hand, if the potential at the reference point C tends to decrease, it will tend to more strongly forward bias the transistor 20 to hold down the potential at the reference point C. Thus, again, the transistors 20 and 30 tend to clamp each other in a stabilized condition when the circuit is in the "on" state. This clamping effect, in both the "off" and the "on" states, is due to the direct coupling of the transistors which provide a D.C. feedback effect.

Figure 2:
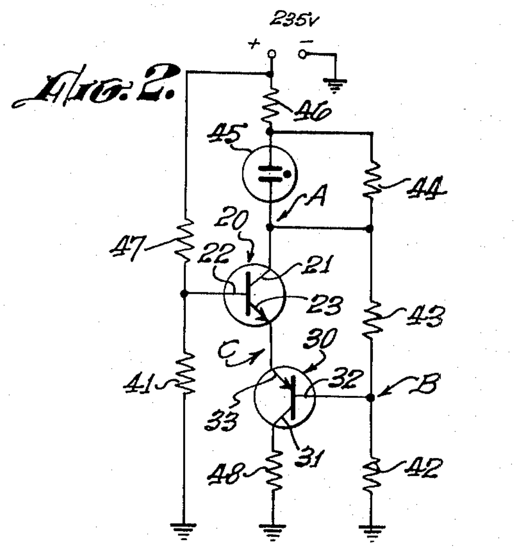
FIGURE 2 is a schematic diagram showing an alternative embodiment of the basic bistable switching circuit of the present invention.

Turning now to FIGURE 2 of the drawing, there is shown a simplified, self-biased version of the basic switching circuit of FIGURE 1, like reference numerals identifying like components throughout. Self-bias is provided in the circuit of FIGURE 2 by grounding one end of the resistor 41 and connecting a resistor 47 between the base 22 of transistor 20 and the postive 235-volt terminal. Thus, the resistors 47 and 41 form a voltage divider to positively bias the base 22 of the transistor 20. The transistor 30 is self-biased by grounding one end of the resistor 42 and coupling the collector 31 to ground through a resistor 48, the resistor 48 functioning in a manner similar to cathode bias in a vacuum tube circuit. The operation of the circuit of FIGURE 2 is identical with that of the fixed bias version shown in FIGURE 1, and is self-stabilizing as before.

Figures 3, 4:
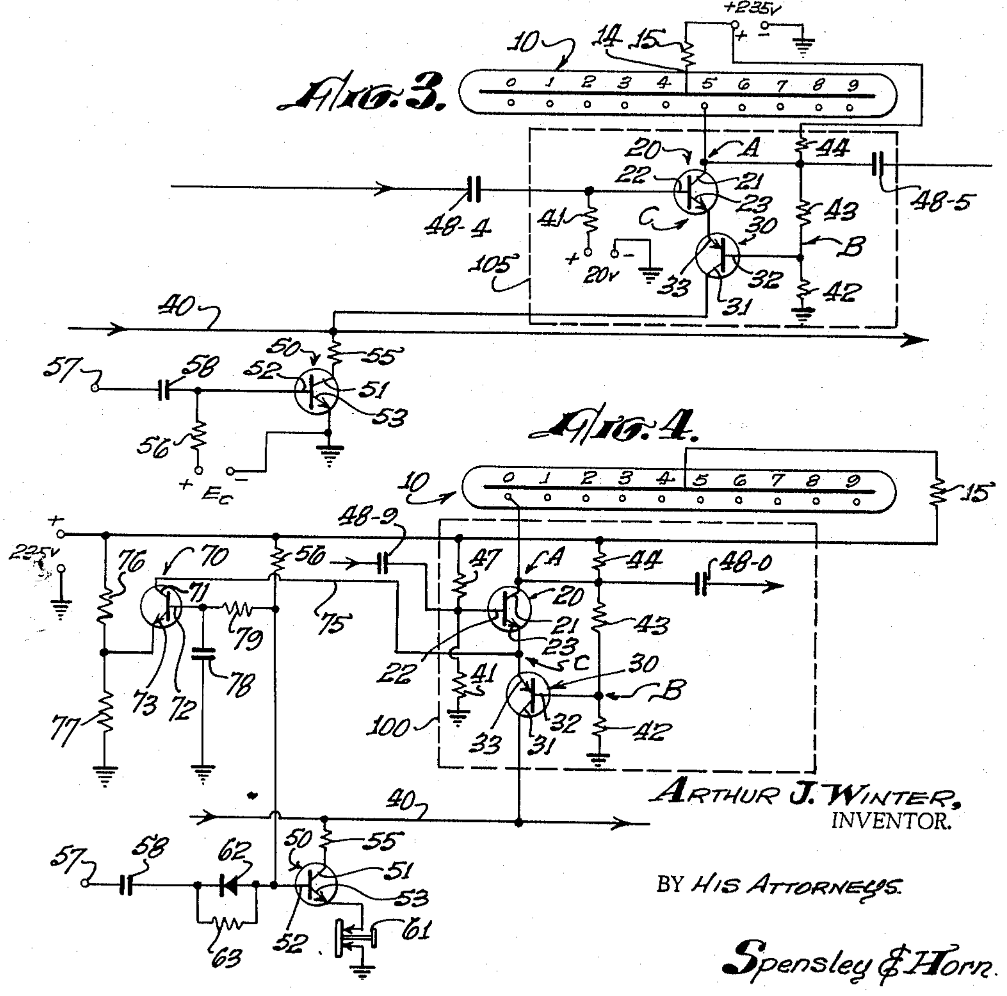
FIGURE 3 is a schematic diagram of a representative decimal ring counter circuit employing the present invention switching circuit.
FIGURE 4 is a schematic diagram showing an alternative embodiment of a representative decimal ring counter circuit employing the present invention switching circuit.

Referring now to FIGURE 3 of the drawing, there is shown how the basic present invention switching circuit can be used in conjunction with a "Nixie" tube type of visual indicating device to form a novel decimal counter. A ten cathode neon tube 10 is shown with one representative bistable switching circuit, indicated by the dotted enclosure 105, connected to the sixth cathode which, when illuminated, presents the number five. The cathodes represent the numerals 0 through 9, going from left to right, each cathode being coupled to a respective switching circuit 100–109. The anode 14 of the tube 10 is coupled to the positive terminal of a source of 235 volt D.C. operating potential, not shown, through a resistor 15. Comparing the circuit of FIGURE 3 with the basic circuitry of FIGURES 1 and 2, the resistor 15 and the tube 10 correspond respectively to the resistor 46 and the tube 45 of FIGURES 1 and 2. The switching circuit 105, in FIGURE 3, utilizes fixed bias for the transistor 20 and self-bias for the transistor 30. In this embodiment, the collector 31 of the transistor 30 is connected to a ring pulse bus 40 to which is fed the trigger pulses which advance the count from one switching circuit to the next in a manner to be hereinafter explained. In addition, the reference point A of each switching circuit is coupled, by means of a coupling capacitor 48, to the base 22 of the transistor 20 of the next succeeding switching circuit. Thus, as shown in FIGURE 3, there is included in the switching circuit 105 a coupling capacitor 48–5 connected to the reference point A and extending out of the right-hand side of the dotted enclosure for coupling to the base of the transistor in the next switching circuit connected to the cathode number 6 of the tube 10. Similarly, one lead of another coupling capacitor 48–4 is shown extending into the left-hand side of the dotted enclosure of the switching circuit 105 and connected to the base 22 of the transistor 20, this coupling capacitor 48–4 coming from the reference point A of the switching circuit 104 connected to the cathode number 4 of the tube 10. The ten switching circuits are connected in a counting ring, with the reference point A of the switching circuit 109 connected to cathode number 9 being coupled by means of a coupling capacitor 48–9 to the base of the transistor of the switching circuit 100 connected to the cathode number 0. The collector 31 of the transistor 30 in each of the switching circuits is connected to the ring pulse bus 40, so that application of a pulse to the bus 40, in a manner to be hereinafter explained, will be applied to each of the ten switching circuits in the counter.

Coupled to the ring pulse bus 40 is an NPN transistor, generally indicated by the reference numeral 50. The transistor 50 includes a collector electrode 51, a base electrode 52 and an emitter elcetrode 53. The collector electrode 51 is coupled to the ring pulse bus 40 by a resistor 55. The emitter 53 is grounded. The base 52 is coupled to a source of positive D.C. bias voltage, indicated as $E_c$, by a resistor 56. A pulse input terminal 57 is coupled to the base 52 by a coupilng capacitor 58.

The operation of the decimal ring counter circuit of FIGURE 3 will now be described. As with a ring counter employing ten switching circuits of the bistable Eccles-Jordan type, twenty transistors are here employed. In the Eccles-Jordan flip-flop circuit, however, ten of the twenty transistors will always be heavily conducting. In the present invention circuit, employing the novel transistor switching circuit, only two of the twenty transistors will be conducting at any given time, i.e. the two switching transistors coupled to the particular "Nixie" tube cathode which is then "on." Thus, it is seen that the present invention circuit affords a significant reduction in operating current, and hence in power supply and cooling requirements. As explained hereinabove with reference to the basic circuitry of FIGURES 1 and 2, the transistor pairs in each of the switching circuits are self-stabilized whether the switching circuit is in the "off" or in the "on" state. The transistor 50 is normally forward biased by the D.C. supply source, $E_c$, the resulting low impedance of the transistor 50 providing the ground return path for each of the switching circuits. Thus, the resistance of the resistor 55, together with the low collector-emitter impedance of the transistor 50 provides a self-biasing effect, the resistance of the resistor 55 being adjusted to normally establish the ring pulse bus 40 at a potential of approximately +5 volts. Thus, with no signal input pulse applied to the input terminal 57, the transistor 50 will be normally forward biased and provide a ground return path for the twenty transistors in the ten switching circuits connected to the "Nixie" tube cathodes. Advancement of the count is provided by application of a negative pulse to the input terminal 57, the input pulse 57 being sufficient to override the forward bias on the transistor 50 and turn it "off." When the transistor 50 is turned "off," the ground return for the switching circuits is effectively opened. Opening of the ground return of the switching circuits will turn all of them "off" for the duration of the negative pulse applied at the base 52 of the transistor 50. If a particular switching circuit happened to be in the "on" state when the negative counting pulse is applied to the input terminal 57, the reverse biasing of the transistor 50 will interrupt the low impedance ground return of the switching circuit and turn off the transistors. Upon turning off of the transistors in that switching circuit, the potential level of the reference ponit A will quickly rise to the aforementioned value of 60 volts, this voltage rise being coupled to the next succeeding switching circuit by means of the coupling capacitor 48 connected to the reference point A. Assuming, in the circuit of FIGURE 3, that the particular switching circuit 104 connected to the cathode number 4 of the output tube 10 is in the "on" state, and all of the remaining nine switching circuits being in the "off" state, when the negative counting pulse is applied to the input terminal 57, a positive input pulse will then be applied to the base 22 of the transistor 20 of the switching circuit 105 connected to the cathode number 5. The negative counting pulse applied to the input terminal 57 is differentiated by the capacitor 58 and the resistor 56 so that the transistor 50 is only momentarily reverse biased. Thus, the collector 31 of the transistor 30 in the switching circuit 105 will be quickly returned to near ground potential while the base 22 of the transistor 20 is still being driven farther positive by the carry pulse applied through the coupling capacitor 48–4. With the switching circuit 105 in the "off" state, it will be recalled that the base 22 is at a potential of approximately +20 volts, while the emitter 23 is at a potential of approximately +30 volts, the transistor 20 thereby being effectively reverse biased. Now, upon coupling of a positive 60 volt pulse to the base 22 of the transistor 20, the transistor 20 will then become forward biased and the transistor turned "on." Turning "on" of the transistor 20 by a positive input pulse applied to its base, will cause the flow of collector current in that transistor, thereby lowering the collector potential (reference point A) and allow ionization of the gas tube 10 at the cathode number 5. Upon firing of the cathode number 5 and the resultant heavy flow of current therethrough, the potential of the reference point A will drop to a lower value, thereby lowering the potential at reference point B and so turning "on" the transistor 30. At this point, both of the transistors 20 and 30 are turned "on" and function to stabilize each other in the "on" state in the aforementioned manner. Thus, the switching circuit 105 will remain in the "on" state until another negative input pulse is applied to the terminal 57 to momentarily decrease the current flow through the transistors 20 and 30, whereupon the ionization of the gas at the cathode number 5 can no longer be maintained and the cathode number 5 becomes extinguished. When the cathode number 5 is turned "off," the potential at the reference point A rises and this positive carry pulse is transmitted through the coupling capacitor 48–5 to the next succeeding switching circuit 106 to turn "on" cathode number 6. Thus, upon application of a negative pulse to the input terminal 57, the count will be advanced one digit. Since the counting circuits are connected in a ring counter configuration, the count will sequentially advance through 9 and then back to 0.

Referring now to FIGURE 4 of the drawing, there is shown a schematic diagram illustrating typical reset circuitry associated with the switching circuit 100 coupled to the cathode 0 of the "Nixie" tube 10, the switching circuit being generally indicated by the dotted line enclosure 100. The transistor 20 is self-biased by grounding the resistor 41 and connecting the resistor 47 to the main source of D.C. operating potential. The transistor 30 is self-biased, as in FIGURE 3, by grounding the resistor 42 and connecting the collector 31 to the ring pulse bus 40. The circuitry associated with the transistor 50 has been modified somewhat from that shown in FIGURE 3, primarily by the addition of a normally closed, single pole push button switch 61 connected between the emitter 53 and ground. Depression of the switch 51 allows momentary interruption of the ground return circuit of the various switching circuits to initiate the reset function, as will be described hereinbelow. Positive bias for the transistor 50 is achieved by connecting the resistor 56 to the primary source of D.C. operating potential. A semiconductor diode 62, shunted by a resistor 63, is included between the coupling capacitor 58 and the base 52 of the transistor 50. Thus, in the various embodiments in accordance with the present invention, several different biasing means have been shown as described, e.g. self-biasing, power supply, and the like. Any of these means may be used in any of the circuit embodiments alternatively.

The reset circuit includes an NPN reset transistor 70. The transistor 70 has a collector electrode 71, a base electrode 72 and an emitter electrode 73. The transistor is self-biased by connecting the emitter electrode 73 to a voltage divider network consisting of resistors 76 and 77. The resistor 77 is connected between the emitter 73 and ground, while the resistor 76 is connected between the emitter 73 and the positive terminal of the main D.C. operating supply. The collector electrode 71 is connected by an electrical lead 75 to the emitters of the transistors 20 and 30 in the switching circuit 100. The base electrode 72 is coupled to the base electrode 52 of the transistor 50 through a low pass filter consisting of a shunt capacitor 78 and a series resistor 79. The function of the reset transistor 70, together with its associated circuitry, is to permit resetting of the counting tube 10 to zero. Hence, the reset transistor is coupled only to the switching circuit 100.

The reset function is initiated by momentary depression of the push button switch 61, thereby briefly interrupting the ground return of the ten switching circuits in the hereinabove described manner. As previously stated, the transistor 50 is normally forward biased and in a conducting state. Upon momentary depression of the switch 61 and interruption of the current flow through the transistor 50, the potential of the base 52 will tend to rise toward the value of the D.C. operating supply voltage, +235 volts in the illustrated examples. This voltage rise is coupled through the resistor 79 to the base 72 of the reset transistor 70, the voltage rise being sufficient to forward bias this transistor. Upon forward biasing of the transistor 70 and the resultant current flow therethrough, reference point C in the switching circuit 100 (the interconnected emitters of transistors 20 and 30) is pulled down toward ground potential since the reference point C is now provided with a ground return path through the transistor 70 and the resistor 77. As the reference point C is brought downward toward ground potential, the transistor 20 becomes forward biased and, being provided with a relatively low impedance ground return path, begins to conduct current, thereby lowering the potential of the reference points A and B. As the potential of the reference point B is lowered, the transistor 30 becomes forward biased and it too begins to conduct as soon as the push button switch 61 is released. Thus, upon release of the push button switch 61, the transistor 50 again begins conducting to provide a low impedance ground return path for the switching circuits, only the switching circuit 100 being in the "on" state. As the transistor 50 begins to conduct current again, its base 52, and consequently the base 72 of the reset transistor 70, is brought back downward toward ground potential, thereby again reverse biasing the reset transistor 70. When the reset transistor 70 is in the reverse biased condition, its collector-emitter resistance is very high and so the transistor 70 then has very little effect upon the potential at reference point C of the switching circuit 100. Since the transistor 70 is thus effectively removed from the circuit, the transistors 20 and 30 in the switching circuit 100 remain stable in the "on" condition until receipt of another negative counting pulse at the input terminal 57 to cause advancement of the count in the hereinabove-described manner.

The diode 62 and the resistor 63 in the base circuit of the transistor 50 provides properly shaped voltage pulses from the preceding decade. Thus, the reset transistor 70 is actuated only upon depression of the push button switch 61.

Thus, there has been described novel switching circuits for use with gaseous discharge tube indicator devices. Although the illustrated practical embodiments involve the use of a "Nixie" tube in a decimal ring counter circuit, it is readily apparent that the present invention switching circuitry may be used with other types of output loads, i.e. non-linear and linear resistive loads, as well as gaseous tubes, and in various other forms of counting circuits. For example, the basic present invention switching circuit may be utilized in a binary counter and is suitable for use in other bistable applications other than ring counting circuits. Furthermore, although the illustrated basic switching circuit embodiments employ a particular arrangement of transistors of opposite conduction characteristics, upon a suitable reversal of biasing polarities PNP transistors could be substituted for NPN transsistors, and vice versa. Hence, although the invention has been described with a certain degree of particularity, the present disclosure has been made only by way of example and numerous changes in construction and in the combination and arrangement of parts may be resorted to without departing from the spirit and the scope of the invention as hereinafter claimed.

What is claimed is:

1. A bistable switching circuit comprising, in combination:

(a) a first transistor of a predetermined conduction characteristic type, said first transistor having a base and an emitter and a collector;

(b) a second transistor of the opposite conduction characteristic type, said second transistor having a base and an emitter and a collector, the emitters of said first and second transistors being directly connected only to each other;

(c) first and second voltage input terminals for connection to a source of direct current operating potential, said second voltage input terminal being connected to a point of common potential;

(d) load impedance means coupled between said first voltage input terminal and the collector of said first transistor, the collector of said second transistor being direct current coupled to said point of common potential whereby the series combination of said load impedance means and said first and second transistors is coupled across said first and second voltage input terminals;

(e) first resistance means coupled between said point of common potential and the base of said second transistor;

(f) direct current feedback means coupled between the collector of said first transistor and the base of said second transistor;

(g) second resistance means, said second resistance means including at least one resistance means, each of said one resistance means having one terminal thereof coupled to said base of said first transistor and another terminal thereof coupled only to a source of fixed potential external to said switching circuit, said second resistance means serving as the only path for bias to be established at said base of said first transistor; and (h) an output terminal coupled to the collector of said first transistor.

2. A bistable switching circuit comprising, in combination:

(a) an NPN transistor having a base and an emitter and a collector;

(b) a PNP transistor having a base and an emitter and a collector, the emitters of said NPN and PNP transistors being directly connected to each other;

(c) first and second voltage input terminals for connection to a source of direct current operating potential with said first voltage input terminal being positive with respect to said second voltage input terminal, said second voltage input terminal being connected to a point of common potential;

(d) load impedance means coupled between said first voltage input terminal and the collector of said NPN transistor, the collector of said PNP transistor being direct current coupled to said point of common potential whereby the series combination of said load impedance means and said NPN and PNP transistors is coupled across said first and second voltage input terminals; with the interconnected emitters of said transistors floating with respect to said point of common potential;

(e) voltage divider resistance means connected between said first and second voltage input terminals, a predetermined higher potential point on said voltage divider resistance means being connected to the collector of said NPN transistor, a predetermined lower potential point on said voltage divider resistance means being connected to the base of said PNP transistor;

(f) resistance means, said resistance means including at least one resistance means, each of said one resistance means having one terminal thereof coupled to said base of said NPN transistor and another terminal thereof coupled only to a source of fixed potential external to said switching circuit, said resistance means serving as the only path for bias to be established at said base of said NPN transistor;

(g) signal input terminals coupled between the base of said NPN transistor and said point of common potential for the appliation thereto of positive voltage switching pulses; and (h) an output terminal coupled to the collector of said NPN transistor.

3. A bistable switching circuit comprising, in combination:

(a) an NPN transistor having a base and an emitter and a collector;

(b) a PNP transistor having a base and an emitter and a collector, the emitters of said NPN and PNP transistors being directly connected only to each other;

(c) first and second voltage input terminals for connection to a source of direct current operating potential with said first voltage input terminal being positive with respect to said second voltage input terminal, said second voltage input terminal being connected to a point of common potential;

(d) load impedance means coupled between said first voltage input terminal and the collector of said NPN transistor, the collector of said PNP transistor being direct current coupled to said point of common potential whereby the series combination of said load impedance means and said NPN and PNP transistors is coupled across said first and second voltage input terminals with the interconnected emitters of said transistors floating with respect to said point of common potential;

(e) first voltage divider resistance means connected between said first and second voltage input terminals, a predetermined high potential point on said first voltage divider resistance means being connected to the collector of said NPN transistor, a predetermined lower potential point on said first voltage divider resistance means being connected to the base of said PNP transistor;

(f) second voltage divider resistance means connected between said first and second voltage input terminals, a predetermined point on said second voltage divider resistance means being connected to the base of said NPN transistor to apply a positive bias voltage thereto, which positive bias voltage is less than the base potential of said PNP transistor when said transistors are in the non-conducting state; said bias voltage being derived only from a source of fixed potential external to said switching circuit;

(g) signal input terminals coupled between the base of said NPN transistor and said point of common potential for the application thereto of positive voltage switching pulses; and (h) an output terminal coupled to the collector of said NPN transistor.

4. A bistable switching circuit for selectively operating a non-linear resistive load, said switching circuit including an NPN transistor and a PNP transistor, each of said transistors having a base, an emitter and a collector, a first bias voltage with respect to a common potential being established to the base of said NPN transistor, resistance means, said resistance means including at least one resistance means, each of said one resistance means having one terminal thereof coupled to said base of said NPN transistor and another terminal thereof being coupled only to a source of fixed potential external to said switching circuit, said resistance means serving as the only path for bias to be established at said base of said NPN transistor, a second bias voltage being applied between the base and the collector of said PNP transistor to urge the base of said PNP transistor negative with respect to its collector, the collector of said NPN transistor being resistively intercoupled with the base of said PNP transistor, the emitters of said transistors being directly interconnected only to each other, the collector of said NPN transistor being coupled by resistance means to the positive terminal of a source of direct current operating potential, the negative terminal of said source of direct current operating potential being connected to said point of common potential, said non-linear resistance load coupled between the collector of said NPN transistor and said positive terminals of said source of direct current.

5. A ring counter comprising, in combination:

(a) a plurality of substantially identical switching circuits, each of said switching circuits including an NPN transistor and a PNP transistor having their emitters directly interconnected only to each other, load impedance means coupled between the collector of said NPN transistor and the positive terminal of a source of direct current operating potential, means for direct-current coupling the collector of said PNP transistor to the negative terminal of said source of direct current operating potential, voltage divider resistance means being connected to the collector of said NPN transistor, a predetermined lower potential point on said voltage divider resistance means being connected to the base of said PNP transistor, resistance means having one terminal thereof connected to the base of said NPN transistor and another terminal thereof coupled only to an external source of fixed direct current bias potential, said resistance means serving as the only path for bias to be established at the base of said NPN transistor, and means electrically coupling the collector of the NPN transistor in each switching circuit to the base of the NPN transistor in the next succeeding switching circuit to thereby intercouple said switching circuits in a counting ring;

(b) a multi-cathode gaseous discharge indicating tube having each one of its cathodes coupled to the collector of the NPN transistor in a different one of said switching circuits and having its anode coupled to said positive terminal of said source of direct current operating potential; and (c) an NPN switching transistor having an emitter and a base and a collector, the emitter of said switching transistor being coupled to a point of common potential, the collector of said switching transistor being coupled to the collector of the PNP transistor in each of said switching circuit, the base of said switching transistor being normally biased at a predetermined voltage positive with respect to said point of common potential, the base of said switching transistor being coupled to a pulse input terminal for the application thereto of predetermined signal voltage pulses which are to be counted.

References Cited by the Examiner

UNITED STATES PATENTS

| | | | |
|---|---|---|---|
| 2,984,753 | 5/1961 | Della Salle | 307—88.5 |
| 3,090,039 | 5/1963 | Walls | 307—88.5 X |
| 3,103,595 | 10/1963 | Logue | 307—88.5 |

OTHER REFERENCES

Electronics, April 1960, page 80 "Cold-Cathode Ring-Counter Drives Numerical Indicator," by P. G. Hodgson.

ARTHUR GAUSS, *Primary Examiner.*